(12) United States Patent
He et al.

(10) Patent No.: US 12,008,024 B2
(45) Date of Patent: Jun. 11, 2024

(54) SYSTEM TO CALCULATE A RECONFIGURED CONFIDENCE SCORE

(71) Applicant: Infrrd Inc, San Jose, CA (US)

(72) Inventors: Jianglong He, New York City, NY (US); Deepak Kumar, Bengaluru (IN)

(73) Assignee: INFRRD INC, San Jose, CA (US)

( * ) Notice: Subject to any disclaimer, the term of this patent is extended or adjusted under 35 U.S.C. 154(b) by 0 days.

(21) Appl. No.: 18/193,660

(22) Filed: Mar. 31, 2023

(65) Prior Publication Data

US 2023/0237081 A1 Jul. 27, 2023

(51) Int. Cl.
*G06F 16/00* (2019.01)
*G06F 16/31* (2019.01)
*G06F 16/33* (2019.01)
*G06N 20/00* (2019.01)

(52) U.S. Cl.
CPC ........ *G06F 16/313* (2019.01); *G06F 16/3347* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2020/0387833 A1* | 12/2020 | Kursun | G06N 20/20 |
| 2022/0067545 A1* | 3/2022 | Calinescu | G06N 20/00 |
| 2022/0237373 A1* | 7/2022 | Singh Bawa | G06F 40/20 |

* cited by examiner

*Primary Examiner* — Anhtai V Tran

(57) ABSTRACT

A system to calculate a reconfigured confidence score is configured to receive a text, a plurality of labels, and a plurality of confidence scores from a plurality of models and assign a weightage to the inputs received from the plurality of models. The system is configured to select a first text with a first label and retrieve a second text, a third text, and a second label. The system is further configured to generate a first, second and third output confidence score for the first text, second text and third text, and corresponding labels. The system compares the plurality of output confidence scores and generates an output which comprises of the first text, the first label, and a final confidence score, wherein the final confidence score is one among the first, second and third output confidence scores.

13 Claims, 4 Drawing Sheets

SYSTEM TO CALCULATE A RECONFIGURED CONFIDENCE SCORE

FIELD OF THE INVENTION

This application relates generally to the field of data extraction. More particularly, the system relates to generating a confidence score for the information extracted from documents on a machine.

BRIEF STATEMENT OF THE PRIOR ART

In this modern world, time saving as well as minimal human intervention is considered as one the most important factors to increase productivity and yield. In this digital age, we can digitize any process wherein the effort and time required to process the information are reduced to a great extent. For example, automating the extraction of required information from documents stored on a machine or obtained from web, may increase productivity and overall finances of any institution.

However, the state of the art extraction models available currently are not accurate to the extent that they can be relied upon without any human intervention. This, as a result, diminishes the positive impact predictive models can have, when applied. Further, the extraction models available currently are not accurate and are unable to re-train themselves based on the ground truth fed to them.

Therefore, there is a need for creating a prediction model that can predict information as well as re-verify, to provide the most accurate information to the end user. Further the model should be capable of providing a confidence score to justify the accuracy of the information being provided to the user.

SUMMARY OF THE INVENTION

In an embodiment, a system to calculate a reconfigured confidence score is disclosed wherein the system with at least one processor may be configured to receive inputs from a plurality of models, wherein inputs from each of the plurality of models may include a first text, a plurality of labels corresponding to the first text, and a plurality of confidence scores corresponding to the first text and their respective labels. The processor may assign a weightage to each of the inputs received from the plurality of models. The processor may choose at least one input from the plurality of inputs received based on the weightage, wherein chosen input may comprise of the first text with a first label. A first output confidence score may be generated based on the first text and the first label. The processor may retrieve a second text associated with the first label and may generate a second output confidence score based on the first label and the retrieved second text, wherein the second text may be different from the first text. The processor may further retrieve a third text with a second label and may generate a third output confidence score based on the retrieved third text and the second label, wherein the third text may be different from the first text and the second text, and the second label may be different from the first label, wherein the second text, the third text, and the second label may be extracted from the database. The processor may compare the first output confidence score, the second output confidence score, and the third output confidence score and may generate an output, wherein the output comprises of the first text, the first label, and a final confidence score, wherein the final confidence score may be one among the first output confidence score, the second output confidence score, and the third output confidence score.

BRIEF DESCRIPTION OF DRAWINGS

Embodiments are illustrated by way of example and not limitation in the figures of the accompanying drawings, in which like references indicate similar elements and in which.

DETAILED DESCRIPTION OF THE INVENTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
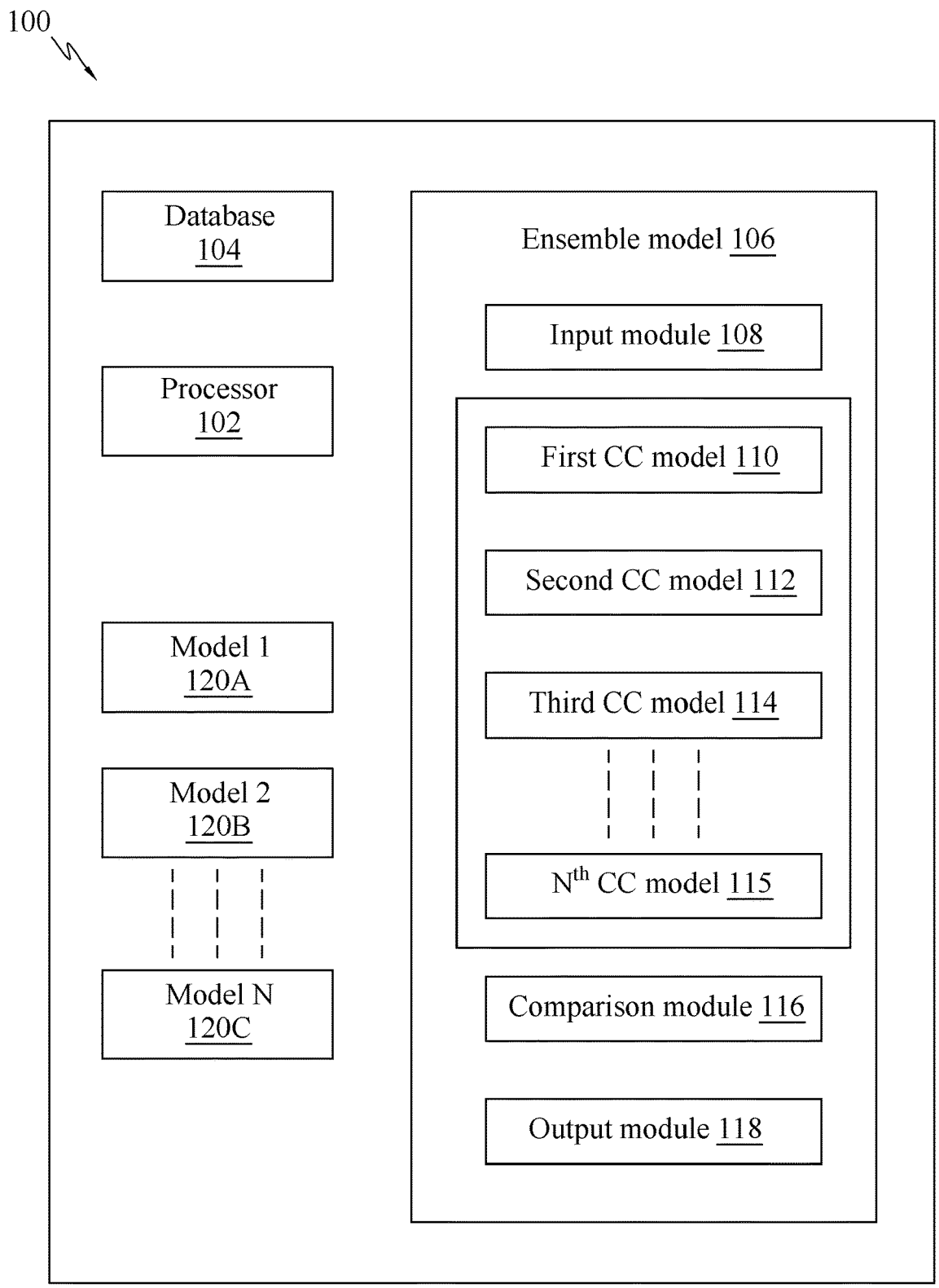
FIG. 1 illustrates a system 100 for predicting a text with a label and a confidence score, in accordance with an embodiment.
Figure 2:
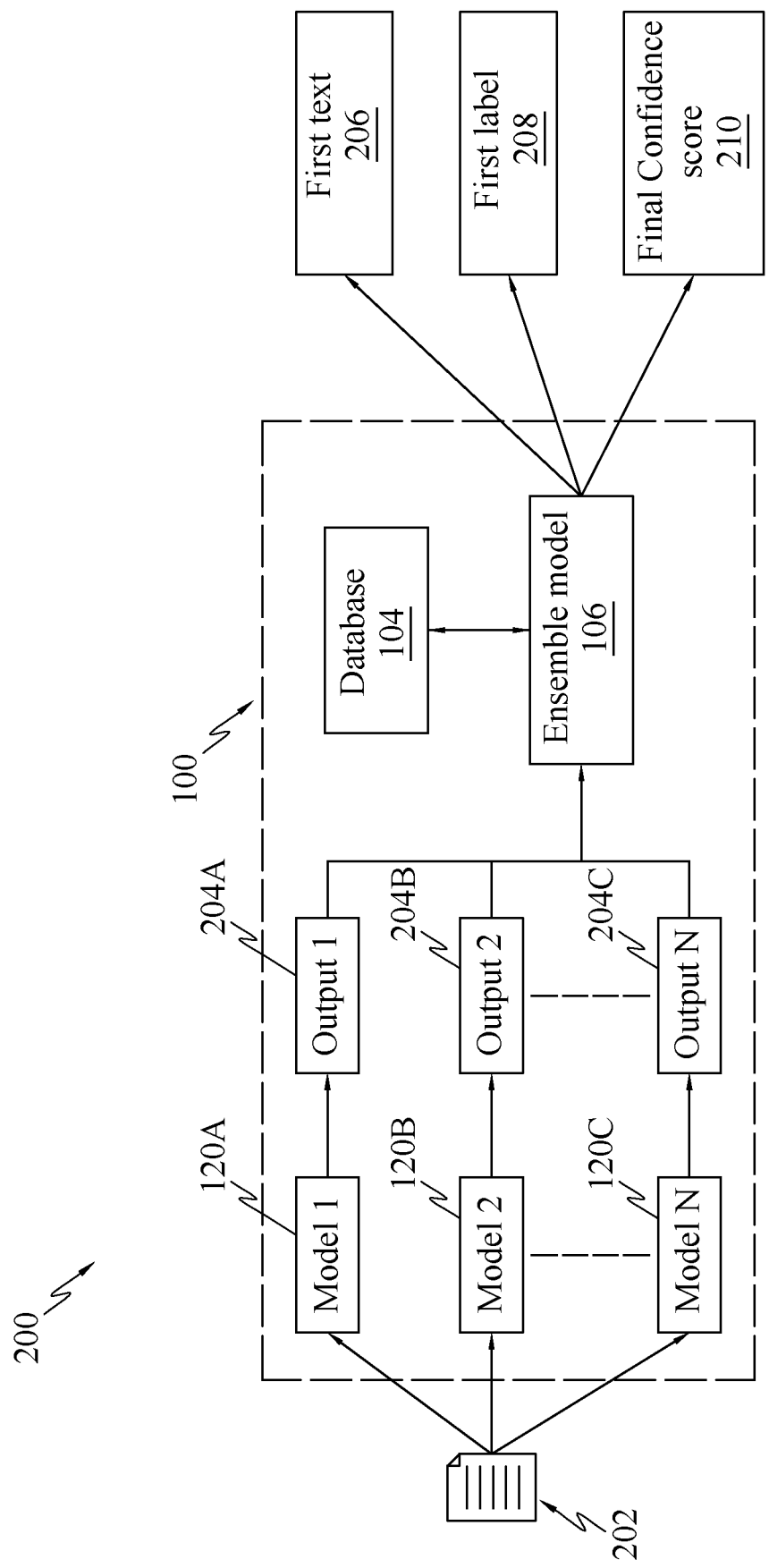
FIG. 2 illustrates a detailed block diagram of the system 100 with flow of data within the system 100, in accordance with an embodiment.

Referring to FIGS. 1-2, a system 100 for predicting a text with a label and a confidence score is disclosed. A document 202 may be any digital document 202 which may include, but not limited to, a scanned copy of a physically available document, a document retrieved from the internet and a document received from a client over an email, among others.

In an embodiment, the system 100 may be configured to predict a text with a label and generate a confidence score for any website, text messages, emails or any other digital source of information.

In an embodiment, the system 100 may comprise of an ensemble model 106, a database 104, plurality of models (120A, 120B, 120C), and a processor 102, wherein the processor 102 may further comprise of plurality of processors.

In an embodiment, the ensemble model 106 may comprise of an input module 108, a plurality of coarse correctional models, a comparison module 116 and an output module 118.

In an embodiment, the plurality of coarse correctional models may comprise of N coarse correctional models, namely, a first coarse correctional model 110 (First CC model), a second coarse correctional model 112 (Second CC model), a third coarse correctional model 114 (Third CC model), and so on up to a Nth coarse correctional model 115 (Nth CC model).

In an embodiment, the ensemble model 106 may be configured to receive inputs from plurality of models (120A, 120B, 120C), wherein inputs from each of the plurality of models (120A, 120B, 120C) include a first text 206, a label corresponding to the first text 206, and a confidence score corresponding to the first text 206 and the label.

In an embodiment, at least one of the plurality of models (120A, 120B, 120C) may receive a document 202, wherein the at least one of the plurality of models (120A, 120B, 120C) may be configured to predict a value, an entity, an embedding vector, and a text and a corresponding label from the document 202.

In an embodiment, the plurality of models (120A, 120B, 120C) may comprise of N models, namely, model-1 120A, model-2 120B, and so on, wherein model-1 120A outputs an output-1 204A, model-2 120B outputs an output-2 204B, and so on.

In an embodiment, the model-1 120A may output output-1 204A, wherein the output-1 204A may comprise of the first text 206, a M-1 label, and a M-1 confidence score. The M-1 label may correspond to the first text 206 and the M-1 confidence score may be associated with the M-1 label and the first text 206.

In the same embodiment, the model-2 120B may output an output-2 204B, wherein the output-2 204B may comprise of the first text 206, a M-2 label, and a M-2 confidence score. The M-2 label may correspond to the first text 206 and the M-2 confidence score may be associated with the M-2 label and the first text 206.

In the same embodiment, a model-N 120C may output an output-N 204C, wherein the output-N 204C may comprise of the first text 206, a M-N label, and a M-N confidence score. The M-N label may correspond to the first text 206 and the M-N confidence score may be associated with the M-N label and the first text 206.

In an embodiment, the system 100 may be configured to assign a weightage to output-1 204A, output-2 204B, output-N 204C and so on, generated by each of the plurality of models (120A, 120B, 120C).

In an embodiment, the plurality of models (120A, 120B, 120C) may be, but not limited to, a temperature scale model, a vector-based grouping model or a knowledge-based model.

Temperature Scale Model

In an embodiment, a machine learning model may provide a score in logits which may be normalized. Further, a temperature scaling hyperparameter may be added to the normalized output. A confidence score calibration may be performed using an additional 'T' parameter, wherein the confidence score may confirm the extracted entities. The confidence score may be compared with a set threshold to filter out the entities with the confidence score better than the set threshold. The machine learning model may be calibrated to cover the parameter at a last normalization layer for confidence score prediction.

Vector-Based Grouping Model

In an embodiment, generated embedding vectors may be grouped to compute a distance between similar and dissimilar embedding vectors. The similar vectors may be brought closer, and the dissimilar vectors may be moved away. Entities may be assigned different labels. Further, two loss functions such as Label-centric loss and instance-centric loss may be used.

In an embodiment, the label-centric loss may reduce the loss between the actual vectors and the label vector.

In an embodiment, the instance-centric loss may decrease the loss in different contexts.

Knowledge-Based Model

In an embodiment, a knowledge base may be created using one or more texts, embedding vectors and other contextual information in the format of graph nodes. A retrieved word from a document may match with any of the text in the knowledge base. If matched, the entity label assigned to the text in the knowledge base may be retrieved.

In an embodiment, the text may be stored as embedding vectors in the knowledge base. The embedding vectors may be used to compute smallest distance between a query vector and the embedding vectors stored in the knowledge base, wherein the query vector is the embedding vector associated with the retrieved word.

In an embodiment, top-k closely matching embedding vectors may be retrieved. If all or majority of the top-k vectors have same label, the query vector may be categorized as being from the same category as the matching embedding vectors from the knowledge base. Thus, the embedding vectors may get labelled at the time of annotation.

In the same embodiment, the model may learn that the embedding vectors are already tagged, which may boost the confidence score for the predicted entity value.

In an embodiment, in the training period, the retrieved top-k vectors may be concatenated to improve the prediction by the model.

In an embodiment, during the evaluation period, a majority voting may be performed on the retrieved top-k vectors to predict the correct value.

Referring back to FIG. 2, in an embodiment, the ensemble model 106 may be configured to generate an output, wherein the output may comprise of the first text 206, a first label 208 corresponding to the first text 206 and a final confidence score 210, wherein the final confidence score 210 relates to the first text 206 and the first label 208.

In an embodiment, the ensemble model 106 may communicate with the database 104, wherein the database 104 may be configured to store additional information by the plurality of models (120A, 120B, 120C) during a training phase.

Figure 3:
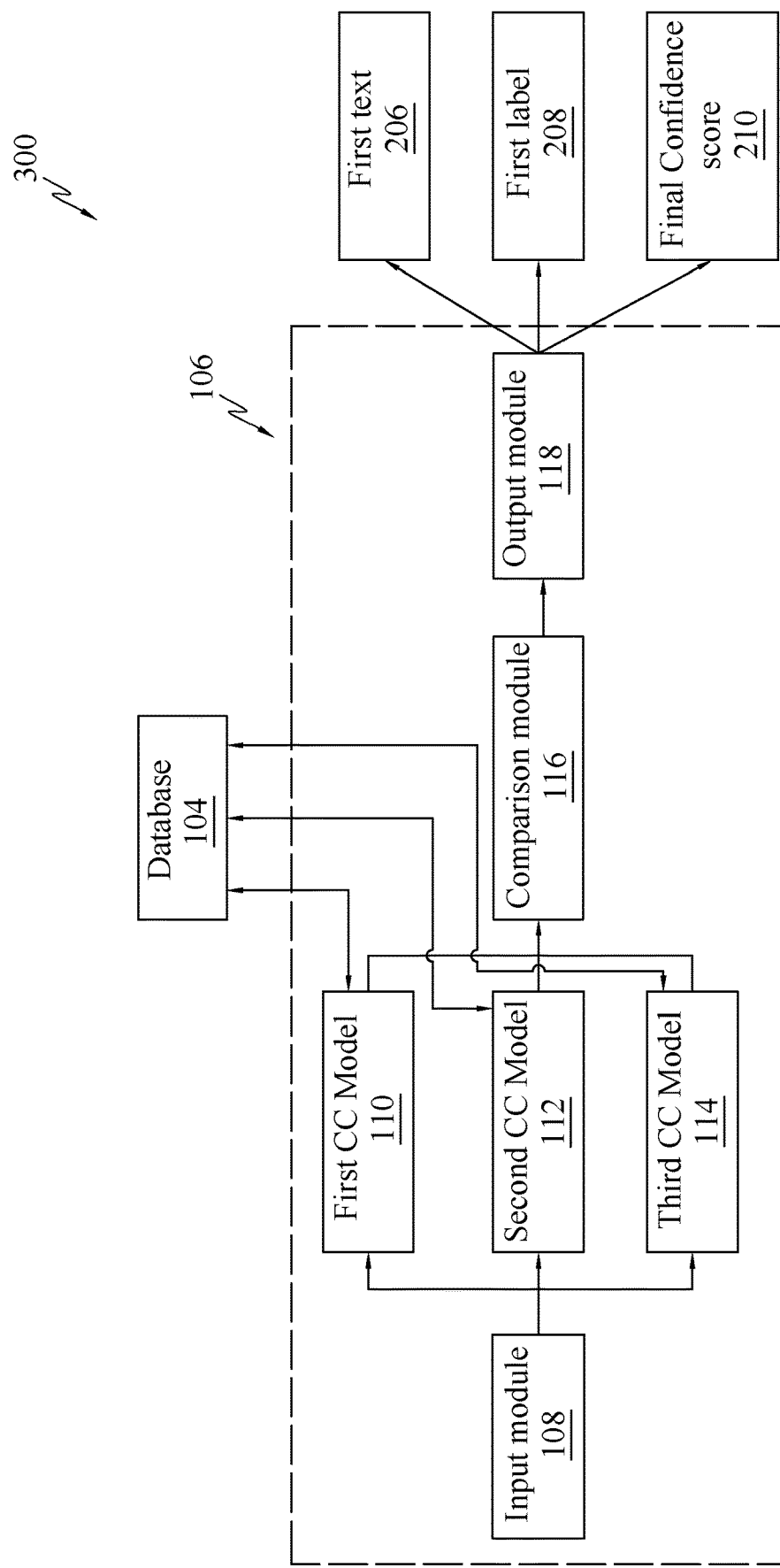
FIG. 3 illustrates a detailed block diagram 300 of an ensemble model 106 with a database 104, in accordance with an embodiment.

FIG. 3 illustrates a detailed block diagram 300 of the ensemble model 106 with the database 104.

In an embodiment, the input module 108, of the ensemble model 106, may receive the first text 206 with the first label 208 from any one of the plurality of models (120A, 120B, 120C).

In an embodiment, the input module 108 may be configured to choose one input based on the assigned weightage, wherein the chosen input may comprise of the first text 206 and the first label 208.

In an embodiment, the system 100 may be configured to assign highest weightage to the input with the highest confidence score.

In an embodiment, the input module 108 may be configured to choose one input with highest weightage.

In an embodiment, at least two coarse correctional models among the plurality of coarse correctional models (110, 112, 114, 115) may be configured to receive input from the input module 108.

In an embodiment, the first coarse correctional model 110, the second coarse correctional model 112, and the third coarse correctional model 114 may be same models or may be different from each other.

In an embodiment, the first coarse correctional model 110 may be configured to generate a first output confidence score based on the first text 206 with the first label 208.

In an embodiment, the second coarse correctional model 112 may be configured to retrieve a second text with the first label and may further generate a second output confidence score, wherein the second text may be different from the first text.

In an embodiment, the second coarse correctional model 112 may be configured to retrieve the second text from the database 104, wherein the second text may be associated with the first label 208 in the database 104.

In an embodiment, the third coarse correctional model 114 may be configured to retrieve a third text with a second label and may further generate a third output confidence score, wherein the third text may be different from the first text and the second text, wherein the second label is different from the first label 208.

In an embodiment, the third coarse correctional model 114 may be configured to retrieve the third text with the second label from the database.

In an embodiment, the Nth coarse correctional model 115 may be configured to retrieve a Nth text with a Nth label and may further generate a Nth output confidence score, wherein the Nth text may be different from the first text, the second text, and the third text, wherein the Nth label is different from the first label 208, and the second label.

In an embodiment, the comparison module 116 may be configured to compare the output confidence scores generated by at least two among the plurality of coarse correctional models. For example, the comparison module 116 may be configured to compare the first output confidence score, the second output confidence score, and the third output confidence score.

In an embodiment, the comparison module 116 may be configured to generate the final confidence score 210 for the first text 206 and the first label 208 by comparing outputs from the plurality of coarse correctional models (110, 112, 114).

In an embodiment, the output module 118 may be configured to receive input from the comparison module 116, and output the first text 206, the first label 208 and the final confidence score 210.

In an embodiment, the final confidence score 210 may relate to the first text 206 and the first label 208.

In an embodiment, the first coarse correctional model 110, the second coarse correctional model 112 and the third coarse correctional model 114 may be configured to receive actual values of the value, the entity, the embedding vector, the text and the corresponding label, predicted from the document 202.

In an embodiment, the plurality of coarse correctional models (110, 112, 114, 115) may be one model selected from the plurality of models (120A, 120B, 120C).

In an embodiment, the plurality of coarse correctional models (110, 112, 114, 115) may be different from the plurality of models (120A, 120B, 120C).

In an embodiment, the plurality of coarse correctional models (110, 112, 114, 115) may be selected based on the performance of each of the plurality of models (120A, 120B, 120C) for generating a label associated with a corresponding text.

In an embodiment, the system 100 may be configured to recover ambiguous labels to improve the classification of the predicted values from the database 104.

In an embodiment, the first coarse correctional model 110 may be configured to recover ambiguous labels to improve the classification of the predicted values from the database 104.

In an embodiment, the system 100 may receive the first text 206 and generate a first embedding vector and assign a third label to the received first text 206, wherein the processor may replace the third label with a fourth label, wherein the fourth label may be retrieved from the database 104. The system 100 may further retrieve, from the database 104, a second embedding vector associated with the first text 206. Further, the system 100 may augment the first embedding vector and the second embedding vector to re-train one or more models from the plurality of models (120A, 120B, 120C) or the plurality of coarse correctional models (110, 112, 114, 115).

In an embodiment, the system 100 may be configured to receive additional inputs during the training phase, wherein the additional inputs may comprise of a ground truth and a contextual information.

In an embodiment, the contextual information may comprise of at least neighbouring value, neighbouring entity, neighbouring embedding vector or neighbouring text information.

In an embodiment, the ground truth may comprise of actual values of the predicted value, the entity, the embedding vector and the text.

In an embodiment, at least one of the plurality of coarse correctional models (110, 112, 114, 115) may be configured to receive additional inputs.

In an embodiment, the system 100 may be configured to predict the additional input from a sample document.

In an alternate embodiment, the plurality of models (120A, 120B, 120C) may be configured to predict the additional input from a sample document.

In an embodiment, the additional input may be provided by a user to at least one of the plurality of coarse correctional models (110, 112, 114, 115).

In an embodiment, the system 100 may be configured to be trained based on the ground truth.

In an embodiment, the system 100 may be configured to train at least one of the plurality of coarse correctional models (110, 112, 114, 115).

In an embodiment, the system 100 may be configured to train the plurality of models (120A, 120B, 120C).

In an embodiment, the additional input may be provided by the user, during a testing phase, to at least one of the plurality of coarse correctional models (110, 112, 114, 115) without training the plurality of models (120A, 120B, 120C).

Figure 4:
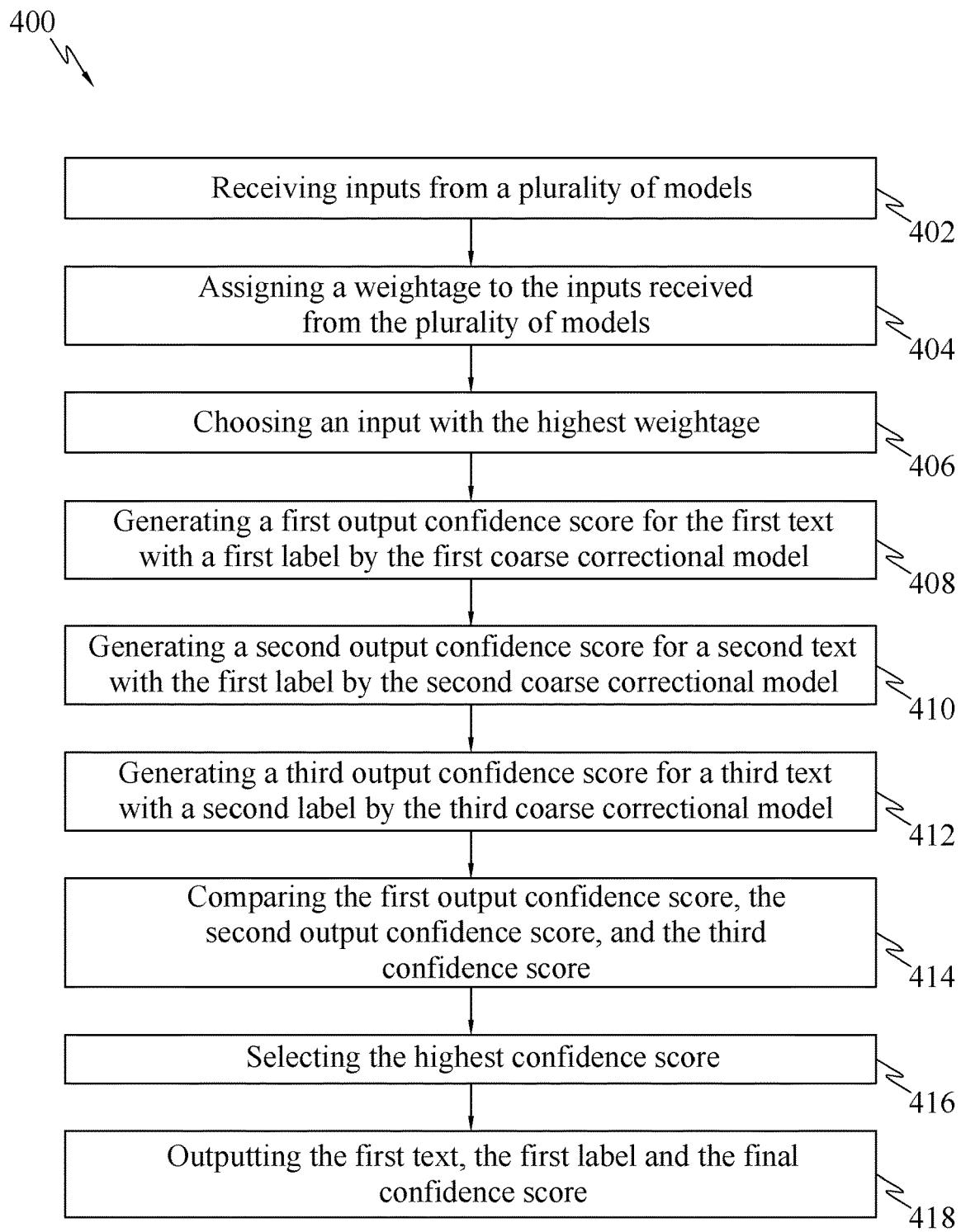
FIG. 4 depicts a flow chart 400 of the process followed by the system 100 to generate a final confidence score 210, in accordance with an embodiment.

FIG. 4 depicts a flow chart 400 of the process followed by the system 100 to generate the final confidence score 210. At step 402, the system 100 may receive inputs from a plurality of models (120A, 120B, 120C), wherein inputs from each of the plurality of models (120A, 120B, 120C) may include a text, a label corresponding to the text. Further, a confidence score may be associated with the text and the label.

At step 404, the processor 102 may be configured to assign weightage to the inputs received from the plurality of models (120A, 120B, 120C) based on the associated confidence score.

At step 406, the processor 102 may be configured to choose an input, based on the associated confidence score wherein, the input may comprise of the first text 206 and the first label 208.

At step 408, the first coarse correctional model 110 may be configured to generate the first output confidence score for the first text 206 with the first label 208.

At step 410, the second coarse correctional model 112 may retrieve the second text with the first label and generate the second output confidence score, wherein the second text may be different from the first text 206.

In an embodiment, the second coarse correction model 112 may retrieve the second text from the database 104, wherein the second text may be associated with the first label 208 in the database 104.

At step 412, the third coarse correctional model 114 may retrieve the third text with the second label and generate the third output confidence score, wherein the third text may be different from the first text 206 and the second text, and the second label may be different from the first label 208.

In an embodiment, the third coarse correction model 114 may retrieve the third text and the second label from the database 104. The third text may be associated with the second label in the database 104.

At step 414, the comparison module 116 may be configured to compare the first output confidence score, the second output confidence score, and the third output confidence score.

At step 416, the comparison module 116 may be configured to select one confidence score which is highest among the first output confidence score, the second output confidence score or the third output confidence score.

At step 418, the output module 118 may be configured to output the first text 206, the first label 208 and the final confidence score 210, wherein the final confidence score 210 may be one among the first output confidence score, the second output confidence score or the third output confidence score.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system to calculate a reconfigured confidence score, the system with at least one processor configured to:
   receive inputs from a plurality of models, wherein inputs from each of the plurality of models include a first text, a plurality of labels corresponding to the first text, and a plurality of confidence scores corresponding to the first text and their respective labels;
   assign a weightage to each of the inputs received from the plurality of models;
   choose at least one input from the plurality of inputs received based on the weightage, wherein: chosen input comprises of the first text with a first label; and
   a first output confidence score is generated based on the first text and the first label;
   retrieve a second text associated with the first label and generate a second output confidence score based on the first label and the retrieved second text, wherein the second text is different from the first text;
   retrieve a third text with a second label, and generate a third output confidence score based on the retrieved third text and the second label, wherein: the third text is different from the first text and the second text; and
   the second label is different from the first label, wherein the second text, the third text, and the second label are extracted from a database;
   compare the first output confidence score, the second output confidence score, and the third output confidence score; and
   generate an output, wherein the output comprises of the first text, the first label, and a final confidence score, wherein the final confidence score is one among the first output confidence score, the second output confidence score, and the third output confidence score.

2. The system as claimed in claim 1, wherein each of the plurality of models is configured to predict a value, an entity, an embedding vector, and a text and a corresponding label from a document.

3. The system as claimed in claim 2, wherein the system comprises an ensemble model configured to receive inputs from the plurality of models.

4. The system as claimed in claim 3, wherein the ensemble model comprises:
   an input module configured to receive inputs from the plurality of models;
   a plurality of coarse correctional models configured to receive inputs from the input module;
   a comparison module configured to generate the final confidence score for the first text and the first label by comparing the outputs from the plurality of coarse correctional models; and
   an output module configured to receive inputs from the comparison module, and output the first text, the first label, and the final confidence score.

5. The system as claimed in claim 4, wherein at least one coarse correctional model, from the plurality of coarse correctional models, is selected from the plurality of models.

6. The system as claimed in claim 4, wherein the processor is configured to:
   receive the first text;
   generate a first embedding vector and assign a third label to the received first text, wherein the processor replaces the third label with a fourth label, wherein the fourth label is retrieved from the database;
   retrieve, from the database, a second embedding vector associated with the first text; and
   augment the first embedding vector and the second embedding vector to re-train one or more models from the plurality of models or the plurality of coarse correctional models.

7. The system as claimed in claim 2, wherein the plurality of models comprises of a temperature scale model, a vector-based grouping model or a knowledge-based model.

8. The system as claimed in claim 2, wherein the system is configured to provide weightage to each of the plurality of confidence scores generated by each of the plurality of models.

9. The system as claimed in claim 2, wherein, during a training phase, the system is configured to:
   receive an additional input; and
   store the additional input in the database, wherein the additional input comprises a ground truth and a contextual information, wherein:
      the ground truth comprises a value, an entity, an embedding vector and a text with an associated label; and
      the contextual information comprises at least neighbouring value, neighbouring entity, neighbouring embedding vector or neighbouring text information.

10. The system as claimed in claim 9, wherein the additional input is predicted, by the processor, from a sample document.

11. The system as claimed in claim 9, wherein the additional input is provided by a user.

12. The system as claimed in claim 9, wherein,
   the system is configured to be trained based on the ground truth;
   the system is configured to train the coarse correctional model; and
   the system is configured to train the plurality of models.

13. A method to calculate a reconfigured confidence score, for an extracted text, the method comprising:
   receiving inputs from a plurality of models, wherein inputs from each of the plurality of models include a first text, a plurality of labels corresponding to the first text, and a plurality of confidence scores corresponding to the first text and their respective labels;
   assigning a weightage, by a processor, to each of the inputs received from the plurality of models;
   choosing one input, by an input module, from the inputs received based on the weightage, wherein: chosen input comprises of the first text with a first label; and
   a first output confidence score is generated by a first coarse correctional model based on the first text and the first label;
   retrieving, by a second coarse correctional model, a second text associated with the first label and generating a second output confidence score based on the first label and the retrieved second text, wherein the second text is different from the first text;
   retrieving, by a third coarse correctional model, a third text with a second label and generating a third output confidence score based on the retrieved third text and the second label, wherein: the third text is different from the first text and the second text; and
   the second label is different from the first label, wherein the second text, the third text, and the second label are extracted from a database;
   comparing, by a comparison module, the first output confidence score, the second output confidence score, and the third output confidence score; and
   generating an output, by an output module, wherein the output comprises the first text, the first label, and a final confidence score, wherein the final confidence score is one among the first output confidence score, the second output confidence score, and the third output confidence score.

* * * * *